Dec. 13, 1932.  B. A. KNOWLES  1,891,095

WINDSHIELD HEATER

Filed Nov. 18, 1931

Inventor

Bernard A. Knowles,

By Owen & Owen,

Attorneys,

Patented Dec. 13, 1932

1,891,095

UNITED STATES PATENT OFFICE

BERNARD A. KNOWLES, OF AZALIA, MICHIGAN

WINDSHIELD HEATER

Application filed November 18, 1931. Serial No. 575,694.

This invention relates to windshields for automobiles, trolley cars, locomotives and the like, and in particular to a heated windshield, for preventing the accumulation thereon of moisture in the form of ice, snow, mist, frost, etc., which might interfere with the clear vision of the driver.

The object of the invention is the provision of a simple and comparatively inexpensive device of this character which will effectively operate to maintain a predetermined portion of a windshield free from the accumulation of ice, snow, or sleet thereon and will also prevent moisture of condensation from collecting on the inner side of said portion, thus maintaining a clear vision through the windshield and rendering driving of vehicles safe in cold and stormy weather.

Figure 1:
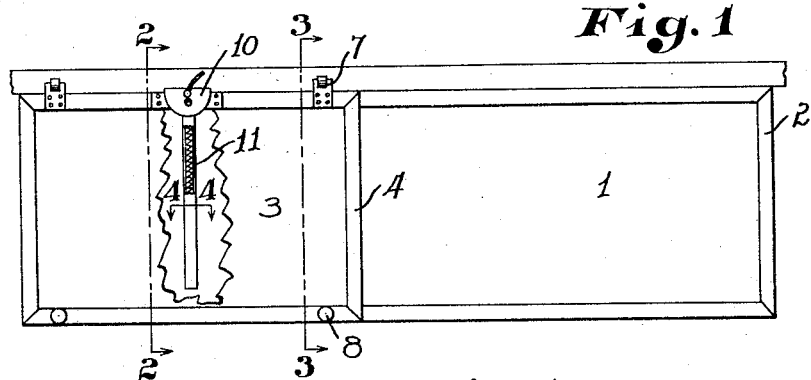
Figure 4:
Figure 2:
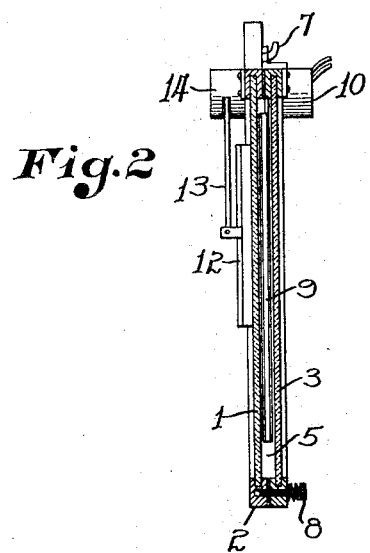
Figure 3:
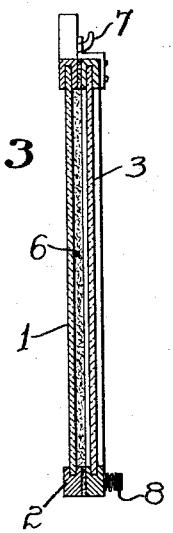

The invention is fully described in the following specification, and while in its broader aspects, it is capable of embodiment in numerous forms, one embodiment thereof is illustrated in the accompanying drawing, in which,—
Figure 1 is a rear or inner side elevation of a windshield equipped with my invention and with a portion broken away. Figs. 2 and 3 are enlarged sections, respectively, on the lines 2—2 and 3—3 in Fig. 1, and Fig. 4 is an enlarged cross-section of the heater element taken on the line 4—4 in Fig. 1.

Referring to the drawing, 1 designates a glass used for windshield purposes, whether on an automobile or otherwise, and mounted in a frame 2.

The portion of this glass through which it is desired to maintain clear vision in cold or stormy weather is covered at its rear or inner side, in the present instance, with a transparent protecting member 3 preferably comprising a single pane of glass mounted in a frame 4, which cooperates with the glass 1 and its frame 2, or both, to space the glass members 1 and 3 in substantially parallel relation to form a closed chamber 5 therebetween. A packing 6 may be provided between the marginal edge portion of the member 3 and the glass 1 and its frame 2 both to prevent rattling and to more effectively close the chamber 5 against the loss of heat provided therein as hereinafter described.

The protecting member 3 is shown, in the present instance, as detachably hinged at its top to the frame 2, as at 7, and as being releasably secured at its lower edge portion to said frame by a thumb screw 8 which extends through the frame 4 and threads into the frame 2.

In order to effect a sufficient heating of the glass 1 to melt ice and sleet which may have accumulated thereon, or to prevent such accumulation, and to have the portion of the glass so affected coextensive with the chamber 5, or at least with the portion of the glass desired to be kept clear for vision purposes, it is not only necessary to apply sufficient heat to the chamber 5 for that purpose, but also to maintain a circulation of such heat within the chamber.

This is accomplished by providing an arm 9 within the chamber for movements therein in parallel relation to the glass and adapted to cover a considerable area of the glass in such movement, and to provide such arm with a heat generating or distributing means. The arm 9 may be attached to a motor 10 of any suitable type, for imparting the requisite movements thereto within the chamber, the same, for instance, as used in connection with windshield wipers, the arm, in the present instance, being adapted to have swinging movements in said chamber.

The heating feature of the arm constitutes, in the present instance, an electrical resistance heater 11 disposed in, or carried by, the arm substantially throughout its length and having suitable connection at its inner end with a storage battery or other convenient source of electrical supply. The swinging of the heater arm agitates and sets up a circulation of the heated air in the chamber 5 and causes a substantially uniform heating of the glass in the outer, or exposed, side of the chamber and prevents moisture of condensation from occurring within the chamber and accumulating on the glass and also sufficiently heats the glass 1 to prevent the accumulation of ice, snow or the like on its outer surface.

The customary wiper element 12 is mounted on the outer side of the windshield glass 1, to clean the same, and its carrying arm 13 is suspended from, and operated by, a motor 14, as well understood in the art. It is apparent that, if desired, a common motor may be employed for actuating the wiper member 12 and heater arm 9. The manner of actuating the heater arm is not important to the invention and such manner need not, therefore, be specifically shown.

It is apparent that the member 3, 4, forming the inner side wall of the chamber 5, together with the heater arm 9 and its actuating means, may be built as a unit and be of a character to enable it to be easily and quickly attached to or removed from a windshield, thus enabling it to be in connection with a windshield only during cold weather.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent is:

1. A windshield having double transparent portions separated in the line of vision therethrough to form an air space therebetween, and means for supplying heat to said air space and movable in said space to agitate and set up a circulation of air therein.

2. A windshield having double transparent portions separated in the line of vision therethrough to form an air space therebetween and means for supplying heat to said air space, said means being automatically movable to change its position in said space.

3. The combination with a windshield of a substantially flat transparent member applied to one side of the windshield and cooperating therewith to form a closed air space therebetween in the line of vision through the windshield, and means within said space for heating the air therein and automatically movable to shift its position in the space.

4. The combination with a windshield of an attachment therefor comprising a transparent member at one side of the windshield cooperating therewith to form a closed air space therebetween in the line of vision through the windshield, and an electrical heater element disposed within said space to heat the air therein and movable to agitate the heated air.

In testimony whereof I have hereunto signed my name to this specification.

BERNARD A. KNOWLES.